United States Patent [19]

Shupe

[11] 4,018,278
[45] Apr. 19, 1977

[54] SURFACTANT OIL RECOVERY PROCESS USABLE IN HIGH TEMPERATURE FORMATIONS

[75] Inventor: Russell D. Shupe, Houston, Tex.

[73] Assignee: Texaco Inc., New York, N.Y.

[22] Filed: Nov. 25, 1974

[21] Appl. No.: 526,780

[52] U.S. Cl. .............................. 166/252; 166/274; 252/8.55 D
[51] Int. Cl.² ......................................... E21B 43/22
[58] Field of Search ................... 166/252, 273–275, 166/305 R; 252/8.55 D

[56] References Cited

UNITED STATES PATENTS

| | | | |
|---|---|---|---|
| 3,346,047 | 10/1967 | Townsend et al. | 252/8.55 D |
| 3,467,190 | 9/1969 | Dunlap et al. | 166/252 |
| 3,500,923 | 3/1970 | Reisberg | 166/275 |
| 3,508,612 | 4/1970 | Reisberg et al. | 166/275 |
| 3,553,130 | 1/1971 | Stratton | 166/275 |
| 3,638,728 | 2/1972 | Hill | 166/273 |
| 3,659,650 | 5/1972 | Stratton | 166/275 |
| 3,799,264 | 3/1974 | Cardenas | 166/275 |
| 3,811,504 | 5/1974 | Flournoy et al. | 166/274 |
| 3,811,505 | 5/1974 | Flournoy et al. | 166/274 |
| 3,827,497 | 8/1974 | Dycus et al. | 166/275 |

FOREIGN PATENTS OR APPLICATIONS 754,477 3/1967 Canada .......................... 252/8.55 D

OTHER PUBLICATIONS

Dunning et al., "Displacement of Petroleum from Sand Surfaces by Solutions of Polyoxyethylated Detergents," Industrial and Engineering Chemistry, vol. 46, Mar. 1954, pp. 591–596.

Primary Examiner—Ernest R. Purser
Attorney, Agent, or Firm—Thomas H. Whaley; Carl G. Ries; Jack H. Park

[57] ABSTRACT

Many petroleum formations contain water having excessive quantities of salt or divalent ions such as calcium or magnesium dissolved therein, and are additionally at a temperature from about 70° to about 300° F. Most surfactants otherwise usable for oil recovery operations are either ineffective in high salinity or hard water, or decompose or precipitate at the higher temperature encountered in formations. A sulfonated, ethoxylated alcohol or alkylphenol surfactant, either as the sole constituent of the surfactant solution, or as a co-surfactant with a more conventional anionic surfactant such as petroleum sulfonate, alkyl sulfonate, or alkylaryl sulfonate, is effective for use in formations containing water having substantial amounts of salt and/or divalent ion salts such as calcium or magnesium dissolved therein, and which additionally may be hotter than 120° F.

16 Claims, 9 Drawing Figures

RATE OF THERMAL DEGRADATION OF SURFACTANT AT 400° F

SURFACTANT OIL RECOVERY PROCESS USABLE IN HIGH TEMPERATURE FORMATIONS

BACKGROUND OF THE INVENTION

1. Field of the Invention

This invention concerns an oil recovery process, and more specifically a surfactant oil recovery process. Still more specifically, this invention is concerned with an oil recovery process using a surfactant which is stable in formations whose water contains high concentrations of salt and/or divalent ions such as calcium and magnesium, and which formations additionally have a temperature in excess of 120° F.

2. Description of the Prior Art

Petroleum is normally recovered from subterranean formations in which it has accumulated by penetrating the formations with one or more wells and pumping or permitting the petroleum to flow to the surface through these wells. Recovery of petroleum from formations is possible only if certain conditions exist in the formations. The petroleum must be present in the formation in an adequately high concentration, and there must be sufficient permeability or interconnected flow channels within the formation to permit the flow of fluid therethrough if sufficient pressure is applied to the fluid. When the formation has natural energy present in the form of an underlying active water drive, or gas dissolved in the petroleum which can exert pressure to drive the petroleum to the producing well, or a high pressure gas cap above the petroleum within the formation, this natural energy may be utilized to recover petroleum. Recovery of petroleum by utilization of natural energy is referred to as primary recovery. When this natural energy source is completed, or in those instances where the formation does not contain sufficient natural energy to support primary recovery, some form of supplemental or enhanced recovery process must be applied to the formation in order to extract petroleum therefrom. Supplemental recovery is sometimes referred to as secondary or tertiary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this inherent weakness of water flooding and many additives have been described in the literature for decreasing the interfacial tension between the injection water and the formation petroleum. For example, U.S. Pat. No. 2,233,381 (1941) discloses the use of polygylcol ether as a surface active agent or surfactant to increase the capillary displacement efficiency of an aqueous flooding medium. U.S. Pat. 3,302,713 discloses the use of petroleum sulfonate prepared from a specified boiling range fraction of the petroleum feed stock for a surfactant in oil recovery operations. Other surfactants which have been proposed for oil recovery operations include alkylpyridinium salts, alkyl sulfates, alkylaryl sulfates, ethoxylated alkyl or alkylaryl sulfates, alkyl sulfonates, alkylaryl sulfonates, and quaternary ammonium salts.

The above described surfactants are satisfactory in some instances, particularly in formations wherein the salinity as well as the water hardness, i.e., concentration of divalent ions including calcium and magnesium is relatively low, usually below a value of from about 200 to about 500 parts per million. When the formation water salinity or hardness exceeds the tolerance level of petroleum sulfonate, for example, mixtures of surfactants such as a mixture of anionic and nonionic surfactants are sometimes utilized. U.S. Pat. Nos. 3,811,504; 3,811,505; 3,811,507, describe certain mixtures of specific anionic and nonionic surfactants which exhibit satisfactory performance in petroleum formations containing unusually high concentrations of divalent ions, e.g. from about 500 to about 18,000 parts per million calcium and magnesium.

While the above described surfactant mixtures may be effective in surfactant recovery operations under ideal conditions, there are problems associated with the use of these materials in some petroleum containing formations. For example, the passage of an aqueous solution containing two totally different species of surfactant dissolved therein frequently results in the selective adsorption of one material rather than the other, or the adsorption of one of the materials at a different rate than the other. Since the optimum performance of a multi-component surfactant system is achieved only when the various surfactant species are all present in critical concentrations, this shift in concentration as a result of selective adsorption of surfactant can result in there being non-optimum or even inoperative concentrations of surfactants at certain points in the formation.

Another problem which frequently degrades the performance received from surfactant flooding operations is associated with the formation temperature. Petroleum sulfonates as well as other alkyl or alkylaryl sulfonates are relatively stable at temperatures normally encountered in subterranean petroleum containing formations; however, these materials are usually not effective in the presence of high salinities and/or high formation water hardness. Conversely, nonionic surfactants such as polyethoxylated alkylphenols are effective for surfactant flooding in formations containing high salinity water or hard water, but these materials become insoluble at temperatures in the range of from about 100° to about 125° F, referred to as their cloud point. Thus, while the materials are not degraded permanently, they are removed from aqueous solution and therefore are ineffective so long as the temperature is above their cloud point.

A type of anionic surfactant which is frequently effective for use as a co-surfactant in combination with petroleum sulfonates or alkyl or alkylaryl sulfonates is a water soluble salt of a polyethoxylated alcohol or alkylphenol sulfate. Unfortunately, the sulfate linkage causes the molecule to be highly sensitive to temperature, which causes hydrolysis or other permanet degradation of the molecule to a non-reactive form, and so these surfactants cannot be used in formations above a certain critical temperature which is characteristic of particular surfactants being used. For example, the sulfate salt of a polyethoxylated alkyphenol havng an alkyl chain length of about 9 carbon atoms and having approximately four or five ethylene oxide groups per molecule is degraded above about 140° F. Since the surfactant solution will ordinarily be present in the formation for long periods of time, e.g. in terms of a number of months or even years, the thermal stability of a surfactant solution is extremely important.

In view of the foregoing discussion, it can be appreciated that there is a substantial, unfulfilled commmercial need for a surfactant usable in oil recovery operations which surfactant is tolerant of formation water salinity and hardness and which can tolerate temperatures in excess of 120° F for long periods of time without hydrolyzing or becoming insoluble.

SUMMARY OF THE INVENTION

The present invention concerns an oil recovery process usable in formations whose temperatures are in excess of 120° F, which formations may also have highly saline and/or hard water, e.g. water containing appreciable quantities of sodium chloride and/or water soluble salts or divalent cations such as calcium or magnesium. The surfactant is a sulfonated, ethoxylated alcohol or alkylphenol having the formula:

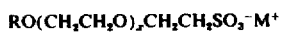

where R is an alkyl or alkylaryl radical wherein the alkyl chains has from 8 to 20 carbon atoms, $x$ is an integer from 1 to 20, and $M^+$ is a metallic cation or ammonium ion. This surfactant is preferably utilized as the sole constituent in an aqueous solution for use in oil recovery operations, or it may be used in combination with an anionic surfactant such as petroleum sulfonate, alkyl sulfonate or alkylaryl sulfonate.

DESCRIPTION OF THE PREFERRED EMBODIMENTS

Figure 1:
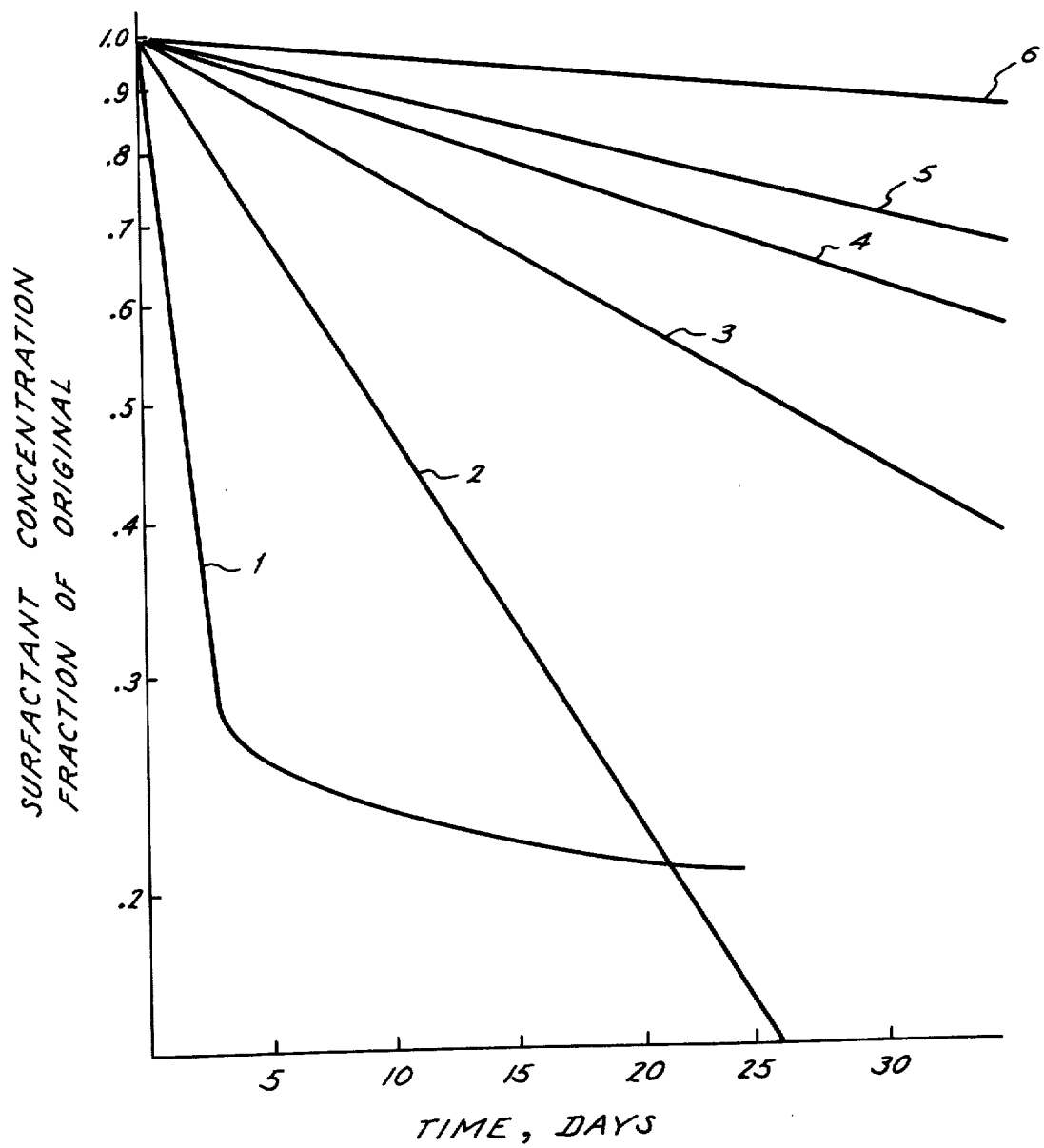
FIG. 1 shows the rate of thermal degradation of a sulfonated polyethoxylated alcohol at various values of pH from about one to about nine at 400° F.

Substances that are suitable for use as surfactants for oil recovery operations are generally compounds which have amphipathic structure; that is, the molecule is composed of groups with opposing solubility tendencies. Generally the molecule will have at least one hydrophobic or oil soluble group and at least one hydrophilic or water soluble group. The oil soluble groups are generally alkyl chains or alkylaryl groups, and the water soluble groups may be either anionic groups such as sulfates or sulfonates, or polyethoxylate groups, or both anionic and nonionic types of water soluble groups may be present on the molecule. Anionic groups generally are water soluble as a result of the polarity and ionizing tendency of the anionic group. Anionic surfactants are generally associated with a cation such as a metallic ion or an ammonium ion. The polyethoxy groups achieve the desired water solubility as a consequence of the ether linkages present in the ethoxy groups. The oxygen in the ether linkage does not ionize as do the anionic groups described above, but rather achieves water solubility as a result of hydrogen bonding with water molecules in the solution. This is somewhat less effective than ionization, and so generally relatively long chains of polyethoxy groups must be present in order to render a nonionic surfactant sufficiently water soluble for it to function effectively.

The balance between the water soluble and oil soluble groups in the molecule is generally very critical and the optimum balance for one purpose is not necessarily the optimum balance for another purpose. For oil recovery operations, it is desirable that the surfactant molecules have limited solubility in the aqueous phase, so that it will tend to accumulate at the interfacial zone between water and oil.

The surfactant for use in the process of my invention is a sulfonated, polyethoxylated aliphatic alcohol or alkylphenol. The general structure is the following:

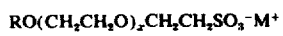

where R is an alkyl or alkylaryl radical having from 8 to 20 carbon atoms in the alkyl chain, $x$ is an integer from 1 to 20, $M^+$ is a metallic cation or ammonium ion.

It is essential that the anionic portion of the molecule be a sulfonate rather than a sulfate group, so that the surfactant will exhibit the desired thermal stability. If a polyethoxylated alkylphenol is reacted with $SO_3$ in the normal reaction for sulfonating an organic material, the resultant material is a sulfate rather than a sulfonate because the $SO_3$ group attaches to the terminal ether linkage oxygen, thus resulting in the sulfur joining the terminal carbon atom through an oxygen atom. The C—O—S bond is the thermally unstable species which is to be avoided.

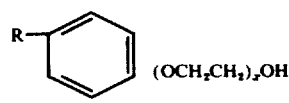

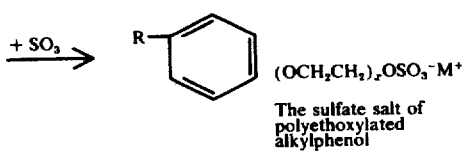

The sulfate salt of polyethoxylated alkylphenol

One method of preparing the desired sulfonate species is as follows. The polyethoxylated alkylphenol is first reacted with sulfurous oxychloride $SOCl_2$ in order to replace the terminal hydroxyl group with a chlorine, which may then be reacted with sodium sulfite, $Na_2SO_3$, to form the desired polyethoxylated alkylphenol sulfonate.

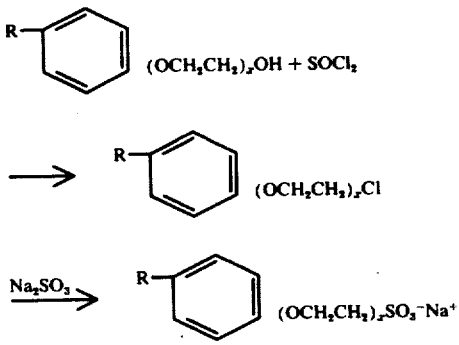

The above mode of formulating the desired sulfonate salt of the polyethoxylated alkylphenol or alcohol by first forming the halide and then reacting it with sulfite (the Strecker reaction) is believed to be the preferred method of synthesizing the compound of the present invention. Another possible route involves forming the sulfate salt and then reacting the sulfate salt with sodium sulfite. Drastic reaction conditions are necessary to force this latter reaction to go, however, e.g. about 200° C for at least 12 hours.

As stated above, the solubility of the surfactant material in water is critical to the proper functioning of the compound in accordance with the process of my invention. Since both temperature and the presence in the solution of salts such as sodium or potassium chloride, as well as water soluble salts containing divalent ions such as calcium or magnesium, all affect the solubility of the material, it is essential that surfactant performance characteristics be determined under conditions which as near as possible simulate the conditions which exist in the formation at the time the aqueous surfactant solution is injected.

Whenever possible, the preferred method for designing a field application of the process of my invention involves determining the formation temperature, as well as the pH and ionic constituents of the water to be used for flooding purposes. Similarly, the pH and water analysis of the petroleum formation water should also be obtained. Ideally, the surfactant solution to be used should match the formation water in terms of salinity and water hardness, so the surfactants of choice can be made to function optimally in both the formation water and the flood water. If the formation water pH is below 6.0, the surfactant solution should be maintained at a value greater than 6.0.

The concentration of the sulfonated polyethoxylated alkylphenol or alcohol used in the process of my invention will vary generally depending on the particular homologue chosen for use, as well as the water salinity and hardness and the temperature to be encountered in the formation. It is highly preferred that the optimum response at various concentrations be measured under conditions simulating those which will be present in the formation, and the concentration which corresponds to the optimum surfactant performance characteristic be identified in this manner. In actual field use, the concentration of surfactant used will be considerably greater than the optimum value determined from the capillary displacement value in order to compensate for surfactant adsorbed by the formation. Generally the concentration of the sulfonated polyethoxylated alkylphenol or alcohol will be from about 0.05 to about 5.0 percent and preferably from about 0.1 to about 1.0 percent by weight The volume of surfactant solution to be utilized in the process of my invention can vary from about 2 to about 75 pore volume percent, and is preferably from about 10 to about 50 pore volume percent. Ordinarily, the petroleum formation will have been subjected to conventional water flooding first although this is not a requirement for the application of the surfactant process of my invention. Water flooding is generally undertaken if it will result in recovery of a reasonable quantity of oil above that required by primary means, since it is much less costly than surfactant flooding or other means of enhanced recovery. If the surfactant flooding process is to be applied to a formation which has already been water flooded, the water sample should be that existing in the formation after water flooding, since the concentration of salt as well as water soluble salts of divalent cations such as calcium or magnesium, may be changed as a consequence of injecting water differing from the original formation water into the formation for water flooding purposes. Additionally, the formation temperature after water flooding should be ascertained since it may have been altered as a consequence of water flooding.

It is also common practice to follow the surfactant solution with an aqueous solution which contains little or no surfactant but which as dissolved in it a substance which increases viscosity of the water so as to attain a favorable mobility ratio between that solution and the previously injected surfactant solution. Hydrophilic polymers such as sodium polyacrylamines or polysaccharides are commonly utilized for this purpose. The type and quantity of viscosity increasing polymers injected subsequent to the surfactant solution can be generally the same as is regularly used for such purposes in conventional surfactant flooding. Generally from about 5 to about 50 pore volume percent of an aqueous solution containing from about 100 to about 800 parts per million of hydrophilic polymer is used. This is followed by water injection which is continued until the water-oil ratio of the fluid being recovered from the formation increases to a point where further injection of water is uneconomical.

EXPERIMENTAL SECTION

In order to establish the operability of the process of my invention, and further to determine the optimum concentrations and to identify the preferred species of surfactant to use, the following experimental work was performed.

While the more meaningful results are those obtained by performing actual displacement tests in which an actual core from the formation is saturated with oil and then flooded with water containing the compounds of interest, such tests are very slow to perform, requiring upwards of a week's time to complete a single data point. Accordingly, a faster method was needed to evaluate the various controllable parameters and the large variety of possible compounds for use in this process. Interfacial tension measurements of solutions can also be utilized, but these too are difficult and time consuming, and so a capillary displacement test was designed to test the solutions under various conditions. These tests are performed by filling a number of closed-end glass capillary tubes with the particular crude oil being studied, and submerging the capillary tubes into the desired aqueous surfactant solution. The tubes are positioned horizontally, and the displacement of oil by the aqueous solution into which the tubes are immersed is observed. The aqueous phase into which the capillary tubes are submerged comprises the indicated mixtures of formation water and fresh water to match the conditions which might be expected in the formation, plus the surfactant mixture being evaluated. The only force tending to displace oil from the capillary tube is the force resulting from the difference in specific gravities of the two fluids, and this is offset by the interfacial tension between oil and formation water. Essentially no displacement occurs when the aqueous solution contains no surfactant solution, nor does any occur under extreme non-optimum conditions. The distance traveled by the meniscus in a specified period, usually 300 seconds in these tests, is observed and this is the quantity reported.

Since the objective of this program was the development of a temperature stable surfactant for use in high temperature formations, the above described capillary displacement tests were performed in specifically modified equipment which could be operated under varying temperatures higher than ambient room temperature, up to 250° F. This necessitated the enclosure of the equipment in a pressure vessel since this is well above the boiling point of water.

In FIG. 1, there are reported the results of six different experiments giving the rates of thermal degradation of a surfactant prepared according to the above-described procedures, which was a sodium salt of a sulfonated, polyethoxylated aliphatic alcohol wherein the alkyl chain contained either 10 or 12 carbon atoms, and the polyethoxylated alcohol from which it was synthesized was comprised of about 60 weight percent ethylene oxide.

All of the heat stability tests, the data from which are reported in FIG. 1, were conducted at 400° F in order to speed up the degradation process in order to obtain the desired data in a reasonable period of time. From this information, the rate of degradation, usually expressed in terms of the half-life of the particular compound at a specified temperature, can be calculated for any particular temperature desired. The rule-of-thumb approximation is that for every 10° C (18° F) decrease in temperature, the half-life of the compound is doubled. This approximation is valid if the semi-log plot of concentration versus time is a straight line indicating first order kinetics. Thus when the half-life is determined at 400° F, it can easily be calculated for any desired temperature. For the present study, the half-lives at 240° F was calculated, since this approximated the temperature of the reservoir for which the present study was initiated.

Curve 1 of FIG. 1 illustrates the rate of degradation of 400° F of the compound tested in distilled water to which sulfuric acid was added to yield a pH of 1. Curve 2 illustrates the same compound in deionized water with pH adjusted to about 9.1 with sodium borate. Curve 3 gives the degradation curve in an aqueous solution having a pH of 6.3, but in actual field water. Curve 4 illustrates the degradation rate of the compound in distilled water with the pH adjusted to 7.5 with sodium hydroxide. Curve 5 demonstrates the response of a comparatively pure sample of the sulfonated polyethoxylated alcohol in distilled water with the pH adjusted to 7.5 with sodium hydroxide. It can be seen by comparing the rates of curves 4 and 5 that there is relatively little difference in the rate of degradation of the pure material and the impure compound represented by curve 4, and thus there is little benefit to be gained by the costly purification process. Finally, curve 6 illustrates the temperature degradation response of a mixture of the sulfonated polyethoxylated alcohol and a linear alkylbenzene sulfonate anionic surfactant in distilled water at a pH 7.5. It can be appreciated that the maximum stability is achieved by use of a mixture of the sodium sulfonated polyethoxylated alcohol and an alkylbenzene sulfonate. This added temperature stability must be considered in the light of the disadvantage inherent in a two or multi-component surfactant solution, including the additional cost of mixing the two materials in a critical ratio, as well as the problems experienced in at least some formations associated with chromatographic separation of the two separate surfactant species as the solution passes through the formation due to the different adsorption rate of different surfactant materials.

Based on the 400° F degradation rates reported in FIG. 1, half lives were calculated for 240°0 F and these values are given in Table I below.

TABLE I

| | HALF LIVES OF SURFACTANTS | | |
|---|---|---|---|
| Run | Surfactant | Solution | 240° F Half Life Years |
| 1 | SPA¹(impure) | deionized water pH = 1 | — |
| 2 | SPA¹(impure) | deionized water pH = 9.1 | 12.3 |
| 3 | SPA¹(impure) | field water pH = 6.3 | 33.0 |
| 4 | SPA¹(impure) | deionized water pH = 7.5 | 57.4 |
| 5 | SPA¹(pure) | deionized water pH = 7.5 | 77.8 |
| 6 | Mixture of SPA¹ and LAS² | deionized water pH = 7.5 | 220 |

¹=sulfonated polyethoxylated alcohol
²=linear alkylbenzene sulfonate

Figure 2:
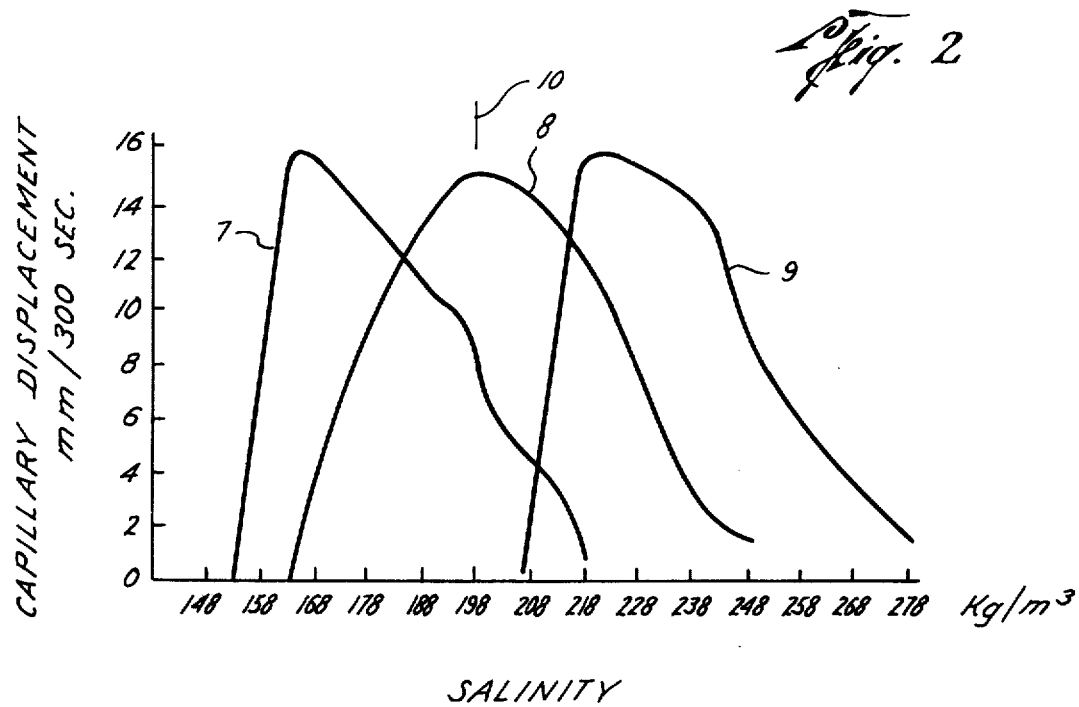
FIG. 2 shows the capillary displacement response (generally indicative of surfactant effectiveness) as a function of aqueous solution salinity for two different sulfonated ethoxylated aliphatic alcohols differing only in alkyl chain length, and for a mixture of the two materials.

In FIG. 2, there are illustrated three different surfactant response curves as a function of salinity. Curve 7 illustrates the response of a sodium salt of a sulfonated polyethoxylated alcohol wherein the alkyl chains contain a mixture of 12 and 14 carbon atoms, and curve 9 illustrates the response of a similar material differing only in that the alkyl chains contain 10 and 14 carbon atoms. It is surprising that this small change in the molecule shifts the surfactant response as much as this on the salinity curve. Curve 8 of FIG. 2 illustrates the response of a mixture of the two materials in approximately 1:1 ratio. Line 10 on the graph illustrates the salinity of a sample of formation water obtained in the Cote Blanche Island Field in Louisiana. This curve illustrates how it is possible to tailor a surfactant salinity response to a particular formation. Based on the results in FIG. 2, a single species can be tailored to yield optimum performance at precisely the desired salinity range.

Figure 3:
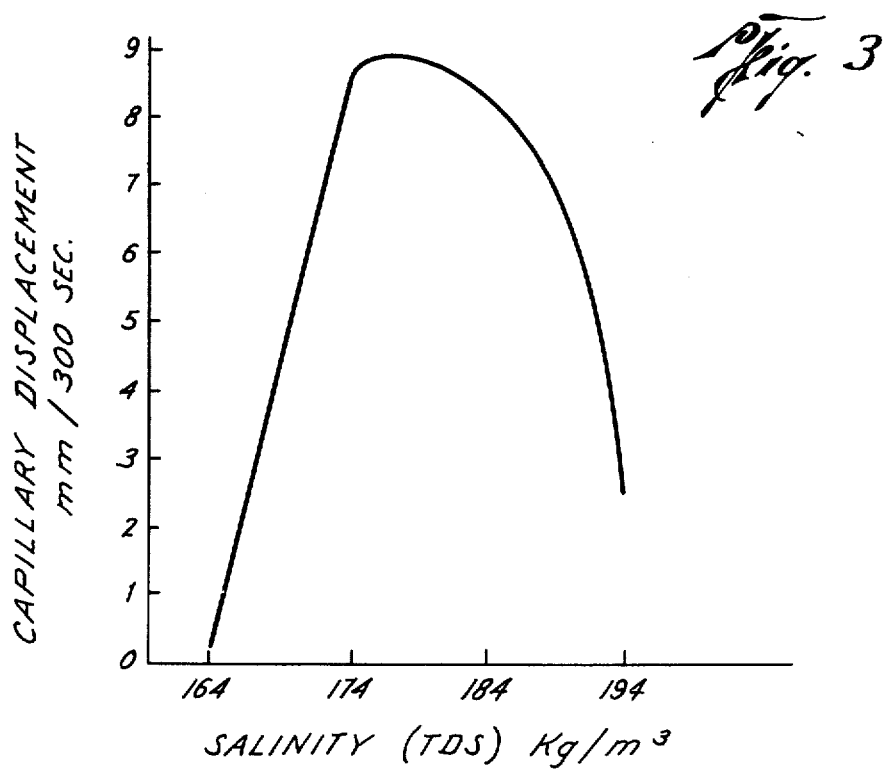
FIG. 3 shows the capillary displacement response of a solution containing a mixture of sulfonated ethoxylated alcohol and a linear alkylbenzene sulfonate as a function of solution salinity.

FIG. 3 illustrates the response of a mixture of a sulfonated polyethoxylated alcohol wherein the alkyl constituent is a mixture of 10 and 12 carbon atoms. This is used in combination with a linear alkylbenzene sulfonate. These tests were also performed using various dilutions of Cote Blanche Island Field Formation water.

Figure 4:
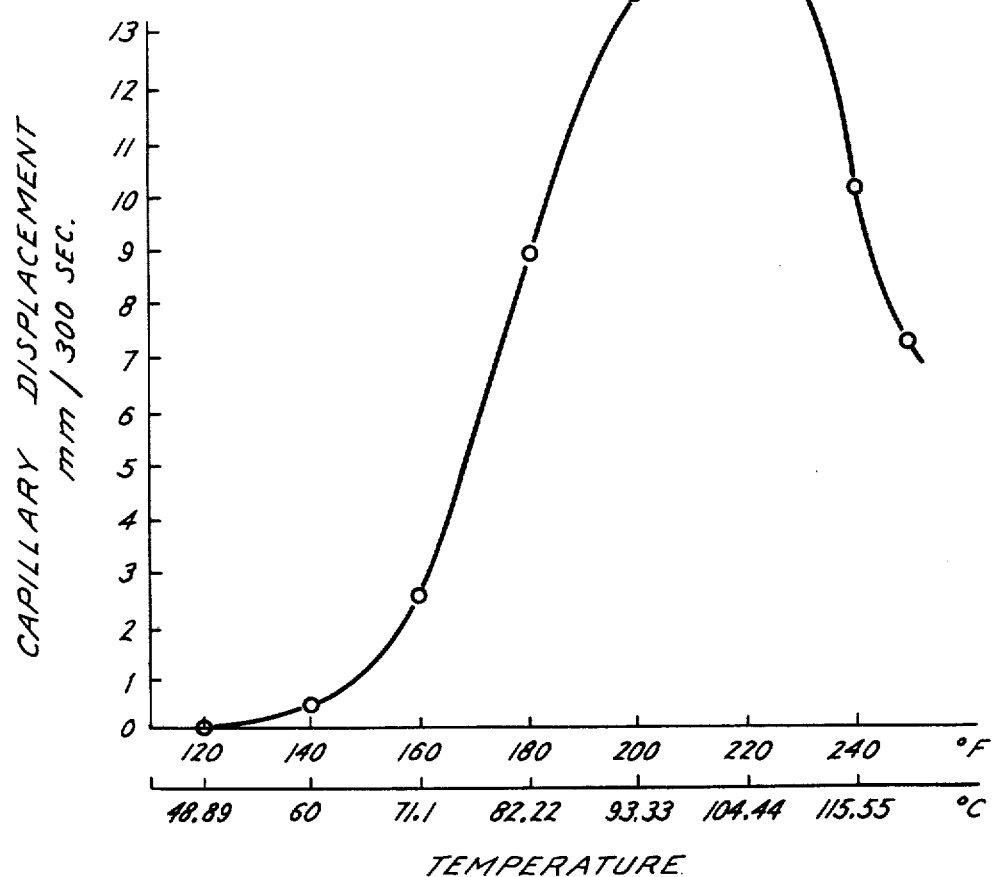
FIG. 4 shows the capillary displacement response of a sulfonated ethoxylated alcohol solution to temperature.

In FIG. 4, there is illustrated the response of a sodium salt of a sulfonated polyethoxylated alcohol wtih a mixture of 12 and 14 carbon atoms in the alkyl chains and the ethoxylated alcohol from which it was synthesized was comprised of approximately 40 percent ethylene oxide. This is used in a mixture of 95% Cote Blanche Island water and distilled water yielding a salinity of approximately 195 kilograms per cubic meter. The capillary displacement of a 0.3 percent by weight solution of this material as a function of temperature is illustrated. It is important to realize that this graph does not depict thermal decomposition since the materials were not present at this temperature for long periods of time; rather, this curve illustrates how the instanteous response varies with the temperature. It can be seen that the optimum capillary displacement occurs at a temperature of about 220°. This phenomena is thought to be a consequence of the solubility of the material in water varying with temperature, with the optimum surfactant response corresponding to the solubility occurring at 220° F. This is one typical response, but the temperature at which different materials will exhibit their optimum performance will vary depending on the alkyl chain length, number of ethoxy groups, ater salinity, etc.

Figure 5:
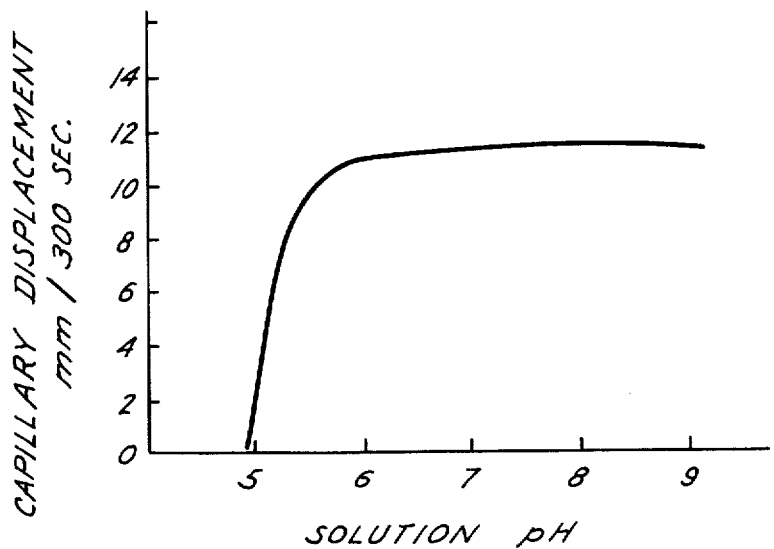
FIG. 5 shows the capillary displacement response of a sulfonated ethoxylated alcohol to solution pH.

FIG. 5 illustrates the response of the same sulfonated polyethoxylated alcohol as was used in FIG. 4, except the pH of the aqueous solution was varied. It can be seen that the material is effective over a fairly broad range from a pH of about 6 to a pH of at least 9. These tests were also performed using formation water from the Cote Blanche Island Field.

Figure 6:
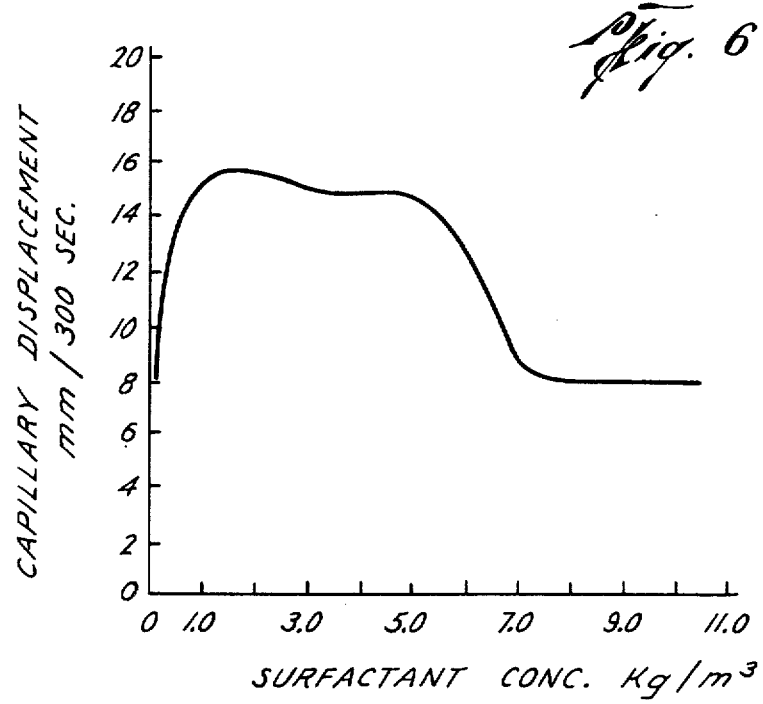
FIG. 6 illustrates the capillary displacement response of a sulfonated ethoxylated alkylphenol solution as a function of surfactant concentration.

FIG. 6 depicts the variation in capillary displacement response to a change in concentration of a sample of sulfonated polyethoxylated alkylphenol in the same field water used above. It can be seen that the optimum response of this particular material is achieved at a value between about 1.10% and about 0.5% by weight, although satisfactory response is achieved throughout the range from about 0.09% to about 1.0% by weight.

Figure 7:
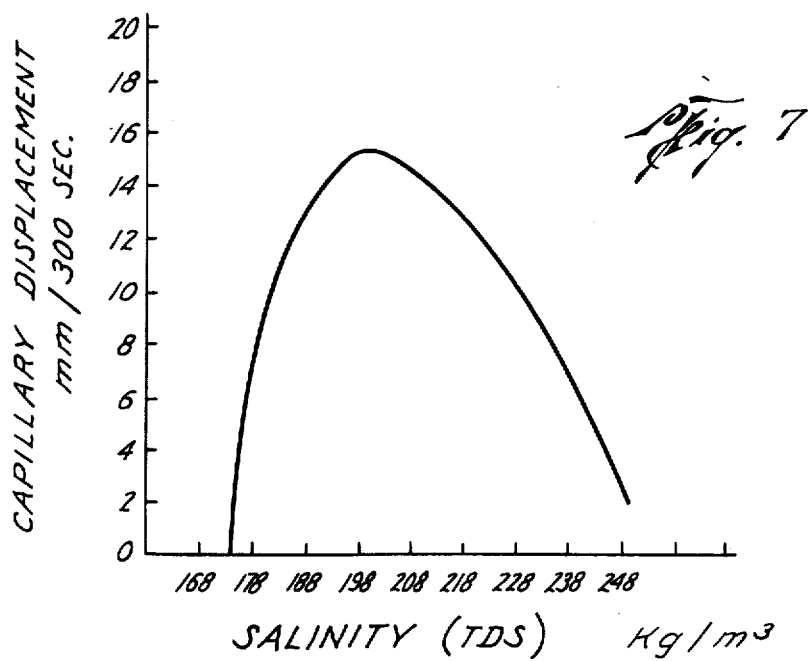
FIG. 7 shows the capillary displacement response of a sulfonated ethoxylated alkylphenol to solution salinity.

FIG. 7 illustrates the capillary displacement response of a solution of the same surfactant sample as was used in FIG. 6, to changes in salinity. As can be seen, the optimum response occurs at a salinity of about 198 kilograms per cubic meter.

Figure 8:
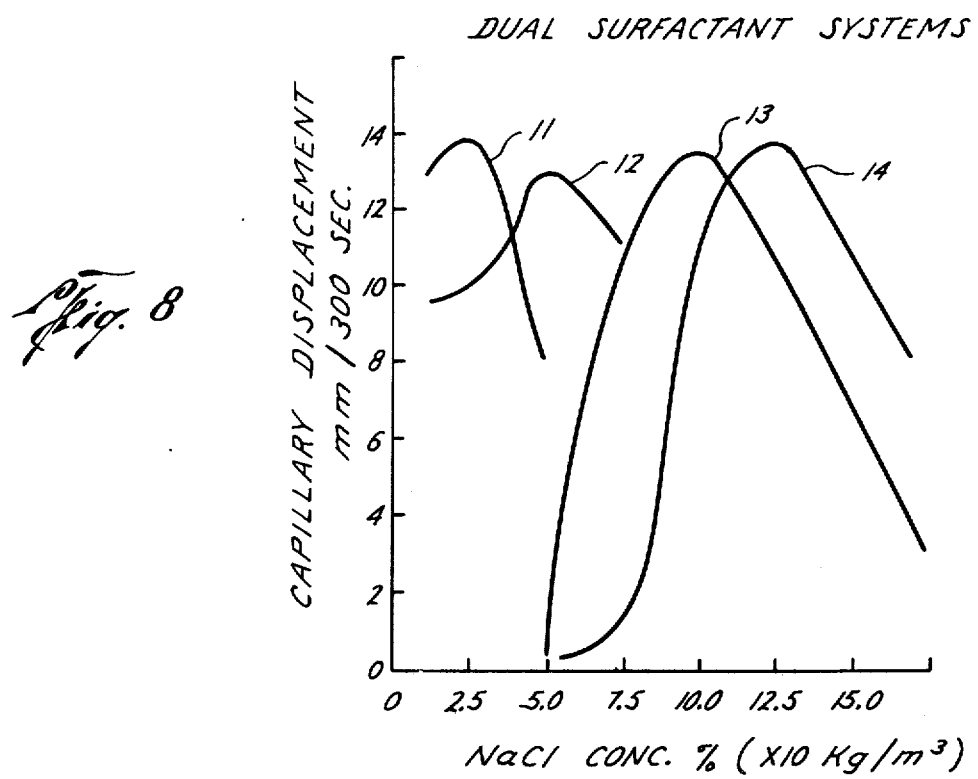
FIG. 8 shows the capillary displacement response of one sulfonated ethoxylated alkylphenol, two sulfonated ethoxylated alcohols, one commercially available sulfated ethoxylated alkyphenol, all tested as solubilizers for a linear alkybenzene sulfonate surfactant.

FIG. 8 illustrates the capillary displacement responses of several dual surfactant systems to salinity. All of the materials in this series were used as solubilizers for a linear alkylbenzene sulfonate surfactant, ammonium salt, which was present in a concentration of 3 kilograms per cubic meter (0.3%) in all tested solutions. The test solutions also contained 2 kg/m$^3$ (0.2%) calcium ions. All tests were conducted at 25° C. Curve 11 of FIG. 8 illustrates the response of a sodium salt of a sulfonated, polyethoxylated alkylphenol in which the alkyl chain contains 9 carbon atoms and which contains four ethoxy groups present in the molecule. Curve 12 of FIG. 8 illustrates the response of the ammonium salt of a sulfated polyethoxylated alkylphenol with a nine carbon atom alkyl chain and four ethoxy groups per molecule. Curve 13 depicts the response of a sodium salt of a sulfonated, polyethoxylated alcohol having a mixture of 12 and 14 carbon atoms in the alkyl chain and three ethoxy groups per molecule. Curve 14 depicts the response of a similar material except that the alkyl chains are 10 and 14 carbon atoms.

It was originally assumed that the values of salinity or other variables yielding the maximum capillary displacement in tests such as those described above were the optimum conditions for such variables for a surfactant flood. Indeed, salinities chosen on the basis of maximum capillary displacements have previously been found to yield excellent oil recoveries in core displacement tests conducted with other surfactant systems. However, for reasons not understood at the present time, core displacement tests using a single, sulfonated polyethoxylated aliphatic alcohol or alkylphenol in solutions having salinities corresponding to maxima of capillary displacement tests have yielded poor oil recovery percentages, whereas core displacement tests using the same surfactant in a solution whose salinity corresponds to a point on the capillary displacement curve to the right of the maxima, especially the point where the value of the curve goes to zero, have been much better. Stated another way, the maximum oil recovery efficiency is achieved if the surfactant solution salinity is greater than the value of salinity which yields the maximum value in the capillary displacement test. The optimum oil recovery results are obtained if the surfactant solution salinity is from about 20% to about 100% greater than the salinity yielding the maximum capillary displacement.

Figure 9:
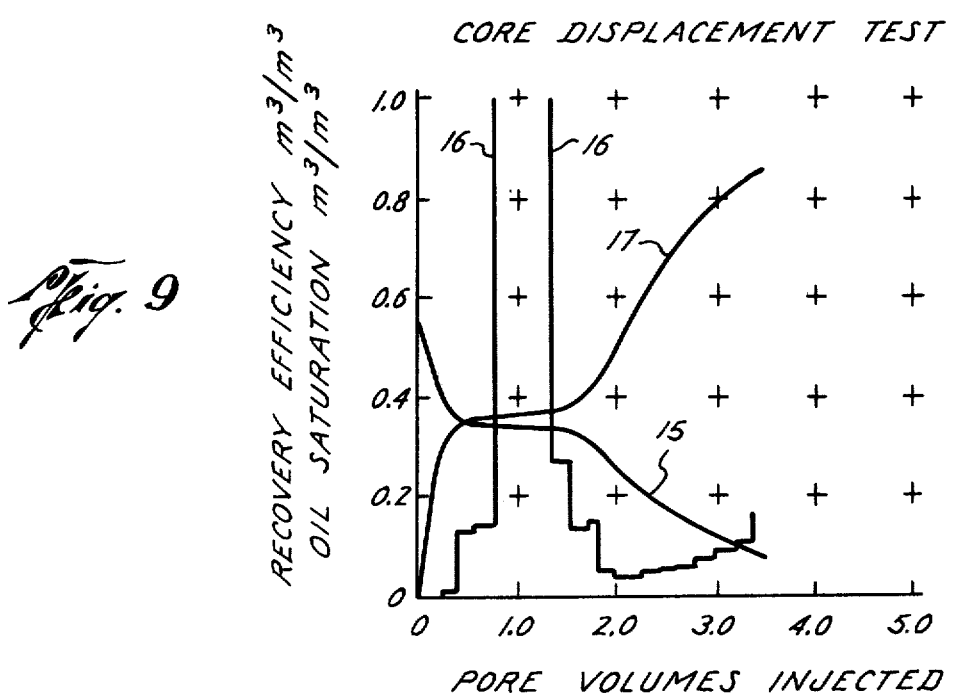
FIG. 9 illustrates a core displacement test utilizing an aqueous solution of a sulfonated ethoxylated alkylphenol at a temperature of 240° F.

FIG. 9 depicts the results of a core displacement test utilizing an aqueous solution of a sodium salt of a sulfonated polyethoxylated dodecylphenol having six ethoxy groups per molecule. The fractional oil recovery as a function of pore volumes of fluid injected is shown in Curve 17, and the fractional residual oil saturation is shown in Curve 15. The water-oil ratio is given by line 16. The core was flooded to a high water-oil ratio before the surfactant flood was initiated. After initiation of the surfactant flood, the water-oil ratio dropped and the oil recovery began increasng. The salinity of the surfactant solution was 183,000 ppm and the total hardness was 9400 ppm. The salinity and hardness corresponded to the salinity value for which the capillary displacement curve intercepted the base line on the right of the maximum, i.e., the base line intercept point at maximum salinity.

FIELD EXAMPLE

For the purpose of additional disclosure but without intending that it be limitative or restrictive of my invention, the following field example is supplied.

A subterranean petroleum containing formation is located at a depth of 8500 feet. The formation is 40 feet thick and the porosity is 30 percent. The field is exploited first by means of primary production utilizing a square grid pattern with 400 ft. line spacing between wells. At the conclusion of primary recovery, which recovers only 25% of the original petroleum in place in the formation, injection wells are drilled in the center of the square grid to convert the field to an inverted five-spot pattern for water injection. Although a large field entails a multiplicity of the square grid patterns each being approximately the same length on the side, it is possible to analyze the field performance by considering only a single grid unit. Water is injected into the injection well and oil is recovered from the production well until the water-oil ratio reaches a value of about 40, at which point water flooding operations is concluded. Only 45% of the original oil in place has been recovered at the termination of water flooding operations, and some form of tertiary recovery operations must be resorted to in order to maintain significant amounts of remaining petroleum.

The water present in the formation has a salinity of approximately 205 kilograms per cubic meter and also contains approximately 6000 parts per million calcium. The temperature of the formation is 240° F. Neither petroleum sulfonate nor alkylaryl sulfonate can be utilized in this formation because of the high salinity and water hardness. The use of polyethoxylated alkylphenol nonionic surfactants is prohibited because of the formation temperature. The use of mixture of anionic surfactant and a polyethoxylated alkylphenol sulfate, which can tolerate this level of salinity and hardness, is prohibited because of the temperature of the formation, since the sulfates decompose at such temperatures in a relatively short period of time. It is determined that a preferred surfactant for this formation is the sodium salt of a sulfonated polyethoxylated alkylphenol wherein the alkyl chain has 12 carbon atoms and there are six polyethoxy groups per molecule.

It is determined that the optimum concentration of this material is 10 kilograms per cubic meter, or about 1.0% by weight. It is known that the pattern being utilized results in 70% sweep efficiency and approximately 50% vertical conformance. Thus the total volume swept by the injected fluid per grid unit will be 400 × 400 × 40 × 0.3 × 0.7 × 0.5 = 672,000 cubic feet.

A 10 percent volume slug of surfactant solution of 67,200 cubic feet, which is approximately 524,915 gallons, is used. This quantity is injected into the injection well, and is displaced by injecting an aqueous solution containing approximately 0.5% by weight polysaccharide to achieve a favorable mobility ratio. This results in increasing the total recovery to approximately 80% of the oil originally in place in the formation.

While my invention has been described in terms of a number of illustrative embodiments, it is not so limited since many variations thereof will be apparent to persons skilled in the art without departing from the true spirit and scope of my invention. Similarly, while mechanisms have been proposed to describe the various results and benefits stemming from the use of the process of my invention, it is not necessarily hereby represented that these are the only or even the principal mechanisms involved, and I do not wish to be bound by any particular explanation of the workings of the process of my invention. It is my intention and desire that my invention be limited and restricted only by those limitations and restrictions as appear in the claims appended hereinafter below.

I claim:

1. A method for recovering petroleum from a subterranean petroleum containing permeable formation penetrated by at last one injection well and by at least one production well in fluid communication with the formation, said formation temperature being in excess of 120° F, said recovery method being of the type wherein an aqueous fluid is injected into the formation by the injection well and oil is displaced by the injected fluid and recovered from the formation by the production well, wherein the improvement comprises introducing into the formation an aqueous surfactant solution wherein
    the sole surfactant present in the sufactant solution is selected from the group consisting of water soluble salts of sulfonated ethoxylated alcohols and sulfonated ethoxylated alkylaryl compounds, and mixtures thereof.

2. A method as recited in claim 1 wherein the water soluble salt has associated therewith a cation selected from the group consisting of sodium, potassium and ammonium.

3. A method as recited in claim 1 wherein the length of the alkyl chain is from about 8 to about 20 carbon atoms.

4. A method as recited in claim 1 wherein the number of ethoxy groups is from about 2 to about 8.

5. A method as recited in claim 1 wherein the formation additionally contains water whose salinity is in excess of approximately 6.0 percent by weight.

6. A method as recited in claim 1 wherein the salinity of the surfactant solution injected into the formation is at least about 6.0% by weight.

7. A method as recited in claim 1 wherein the formation water has dissolved therein polyvalent ions including calcium and magnesium in excess of 500 parts per million.

8. A method as recited in claim 8 wherein the surfactant solution contains polyvalent ions including calcium and magnesium in excess of 500 parts per million.

9. A method as recited in claim 1 wherein the temperature of the surfactant solution is in excess of surface ambient temperature.

10. A method as recited in claim 1 wherein the temperature of the surfactant solution is at least 120° F.

11. A method as recited in claim 1 wherein the concentration of surfactant is from about 0.05 to about 5.0 percent by weight.

12. A method as recited in claim 1 wherein the concentration of surfactant is from about 0.10 to about 1.0 percent by weight.

13. A method as recited in claim 1 wherein the volume of surfactant solution injected is from about 2 to about 75 pore volume percent.

14. A method as recited in claim 1 wherein the volume of surfactant is from about 10 to about 50 pore volume percent.

15. A method of recovering petroleum from a subterranean, petroleum containing, permeable formation penetrated by at least one injection well and one production well, both wells being in fluid communication with the formation, comprising
    introducing an aqueous, saline solution containing a surfactant selected from the group consisting of water soluble salts of sulfonated, polyethoxylated aliphatic alcohols and sulfonated, polyethoxylated alkylphenols, wherein the salinity is determined by performing capillary displacement tests wherein the salinity of the surfactant solution is about equal to the salinity corresponding to the maximum salinity where the value of capillary displacement approaches zero.

16. A method of recovering petroleum from a subterranean, petroleum containing, permeable formation penetrated by at least one injection well and one production well, both wells being in fluid communication with the formation comprising introducing an aqueous, saline solution containing a surfactant selected from the group consisting of water soluble salts of sulfonated, polyethoxylated aliphatic alcohols and water soluble salts of sulfonated, polyethoxylated alkylphenols and mixtures thereof, wherein the salinity of the solution is from about 20% to about 100% greater than the salinity at which the surfactant exhibits the maximum capillary displacement.

* * * * *